United States Patent
Manem et al.

(10) Patent No.: US 10,415,622 B2
(45) Date of Patent: Sep. 17, 2019

(54) METHOD AND SYSTEM FOR HYBRID GANG CHANNEL BOLTED JOINT

(71) Applicant: General Electric Company, Schenectady, NY (US)

(72) Inventors: Amarnath Veera Venkata Manem, Karnataka (IN); Chandrasekhara Rao Devarasetty, Karnataka (IN)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 15/145,219

(22) Filed: May 3, 2016

(65) Prior Publication Data

US 2017/0321739 A1 Nov. 9, 2017

(51) Int. Cl.
*F02C 7/20* (2006.01)
*F16B 37/06* (2006.01)

(52) U.S. Cl.
CPC ............. *F16B 37/068* (2013.01); *F02C 7/20* (2013.01); *F05D 2260/31* (2013.01)

(58) Field of Classification Search
CPC .. F02C 7/20; F23R 3/60; F16B 37/068; F05D 2240/90; Y10T 403/645; Y10T 403/642; Y10T 403/64
USPC ........................................ 411/172–177, 183
See application file for complete search history.

(56) References Cited

U.S. PATENT DOCUMENTS

| | | | |
|---|---|---|---|
| 2,292,239 A * | 8/1942 | Pierce | A43C 15/161 36/59 R |
| 2,968,329 A | 1/1961 | Reiner | |
| 3,315,721 A * | 4/1967 | Koehl | F16B 37/044 411/113 |
| 3,361,175 A * | 1/1968 | Koehl | F16B 37/04 411/527 |
| 3,962,843 A * | 6/1976 | King, Jr. | B23P 9/025 403/243 |
| 4,488,844 A | 12/1984 | Baubles | |
| 5,716,178 A * | 2/1998 | Vu | B64C 1/12 411/104 |
| 6,302,628 B1 | 10/2001 | Berecz et al. | |
| 7,674,080 B2 | 3/2010 | Agg et al. | |
| 8,793,854 B1 | 8/2014 | Clark | |
| 9,083,169 B2 | 7/2015 | James et al. | |
| 9,121,432 B2 | 9/2015 | Wong et al. | |

(Continued)

*Primary Examiner* — Todd E Manahan
*Assistant Examiner* — Henry Ng
(74) *Attorney, Agent, or Firm* — General Electric; James Reed

(57) ABSTRACT

A fastening assembly and a method of coupling a flange joint are provided. The fastening assembly includes a channel assembly including an elongate web having a pair of opposing side edges, a plurality of spaced apart apertures extending through the web, and at least one anti-rotation lip extending away from the at least one side edge of the pair of side edges. The fastening assembly also includes a threaded nut assembly including a threaded internal bore and an external anti-rotation tab, the threaded nut assembly coupled to the web with the threaded bore aligned with a respective one of the plurality of spaced apart apertures. The fastening assembly further includes a clinch nut assembly including a threaded internal bore, an external anti-rotation tang, and a bore extension, the clinch nut assembly configured to fixedly couple the web to an outside face of a connection flange.

11 Claims, 8 Drawing Sheets

(56) References Cited

U.S. PATENT DOCUMENTS

| | | | |
|---|---|---|---|
| 9,140,125 B2 * | 9/2015 | Ivakitch | F01D 5/025 |
| 2005/0111911 A1 * | 5/2005 | Zdravkovic | B21J 15/025 |
| | | | 403/283 |
| 2005/0204746 A1 * | 9/2005 | Chereau | F01D 11/18 |
| | | | 60/796 |
| 2013/0011253 A1 * | 1/2013 | Mulcaire | F01D 25/243 |
| | | | 415/214.1 |
| 2014/0169908 A1 * | 6/2014 | Wong | F16B 37/044 |
| | | | 411/85 |
| 2014/0169959 A1 * | 6/2014 | Manriquez | F02C 7/28 |
| | | | 415/214.1 |
| 2014/0283363 A1 | 9/2014 | Wilkerson et al. | |
| 2014/0341722 A1 * | 11/2014 | Belmonte | F01D 11/122 |
| | | | 415/173.4 |
| 2016/0223133 A1 * | 8/2016 | Peters | F16M 13/02 |

* cited by examiner

SECTION 7-7

METHOD AND SYSTEM FOR HYBRID GANG CHANNEL BOLTED JOINT

BACKGROUND

The field of the disclosure relates generally to rotatable machines and, more particularly, to a method and system for coupling components of a rotatable machine together.

Rotatable machines, such as, but, not limited to, gas turbine engines, include a plurality of components that are typically assembled in a vertically oriented stack. As the rotatable machine is assembled, one side of a connecting flange may become covered or inaccessible for handling the fastening devices, for example, nuts and bolts. Threaded nuts may be coupled together in gang fashion and the ganged threaded nut assembly may be temporarily held in place to start one or more of the bolts in the threaded nut assemblies. However, such a method is not secure and is often necessarily repeated before the bolts are sufficiently started in the threads. Other methods of securing the threaded blind nuts to the obscured flange face require additional labor and fastening components that may dislodge and be lost and/or cause damage in the machine.

BRIEF DESCRIPTION

In one aspect, a fastening assembly includes a channel assembly including an elongate web having a pair of opposing side edges, a plurality of spaced apart apertures extending through the web, and at least one anti-rotation lip extending away from the at least one side edge of the pair of side edges. The fastening assembly also includes a threaded nut assembly including a threaded internal bore and an external anti-rotation tab, the threaded nut assembly coupled to the web with the threaded bore aligned with a respective one of the plurality of spaced apart apertures. The fastening assembly further includes a clinch nut assembly including a threaded internal bore, an external anti-rotation tang, and a bore extension, the clinch nut assembly configured to fixedly couple the web to an outside face of a connection flange.

In another aspect, a method of coupling a flange joint includes coupling a plurality of threaded nut assemblies to a channel assembly aligned with respective apertures in the channel assembly and coupling the channel assembly to a first outside face of a first flange using a blind clinch nut assembly. The method also includes positioning inside faces of the first flange and a second flange of a connection flange assembly proximate each other such that apertures through the first and second flange align, threading a plurality of bolts from a first outside face of the second flange through at least some of the apertures through the first and second flange into respective threaded nut assemblies, and threading a plurality of bolts from a first outside face of the second flange through at least some of the apertures through the first and second flange into respective clinch nut assemblies.

In yet another aspect, a turbofan engine includes a core engine including a multistage compressor and a combustor section. The multistage compressor includes a first connection flange and the combustor section includes a second connection flange complementary to the first connection flange. The turbofan engine also includes a fastening assembly configured to couple the first connection flange and the second connection flange together. The fastening assembly includes a channel assembly that includes an elongate web having a pair of opposing side edges, a plurality of spaced apart apertures extending through the web, and at least one anti-rotation lip extending away from the at least one side edge of the pair of side edges. The fastening assembly also includes a threaded nut assembly including a threaded internal bore and an external anti-rotation tab, the threaded nut assembly coupled to the web with the threaded bore aligned with a respective one of the plurality of spaced apart apertures. The fastening assembly further includes a clinch nut assembly including a threaded internal bore, an external anti-rotation tang, and a bore extension, the clinch nut assembly configured to fixedly couple the web to an outside face of a connection flange.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

Embodiments of a connection flange fastening assembly described herein provide a cost-effective method for retaining a plurality of specially formed blind nuts to a flange that may become inaccessible or unreachable by tools during assembly of a machine. The newly designed gang channel is retained against the flange with the help of clinch or swage nuts rather than traditional rivets or flat head screws. The clinch nut is swaged in to the flange and secures the gang channel, which is positioned between the flange and the clinch nut. The clinch nut is the only attachment of the gang channel to the flange.

Figure 1:
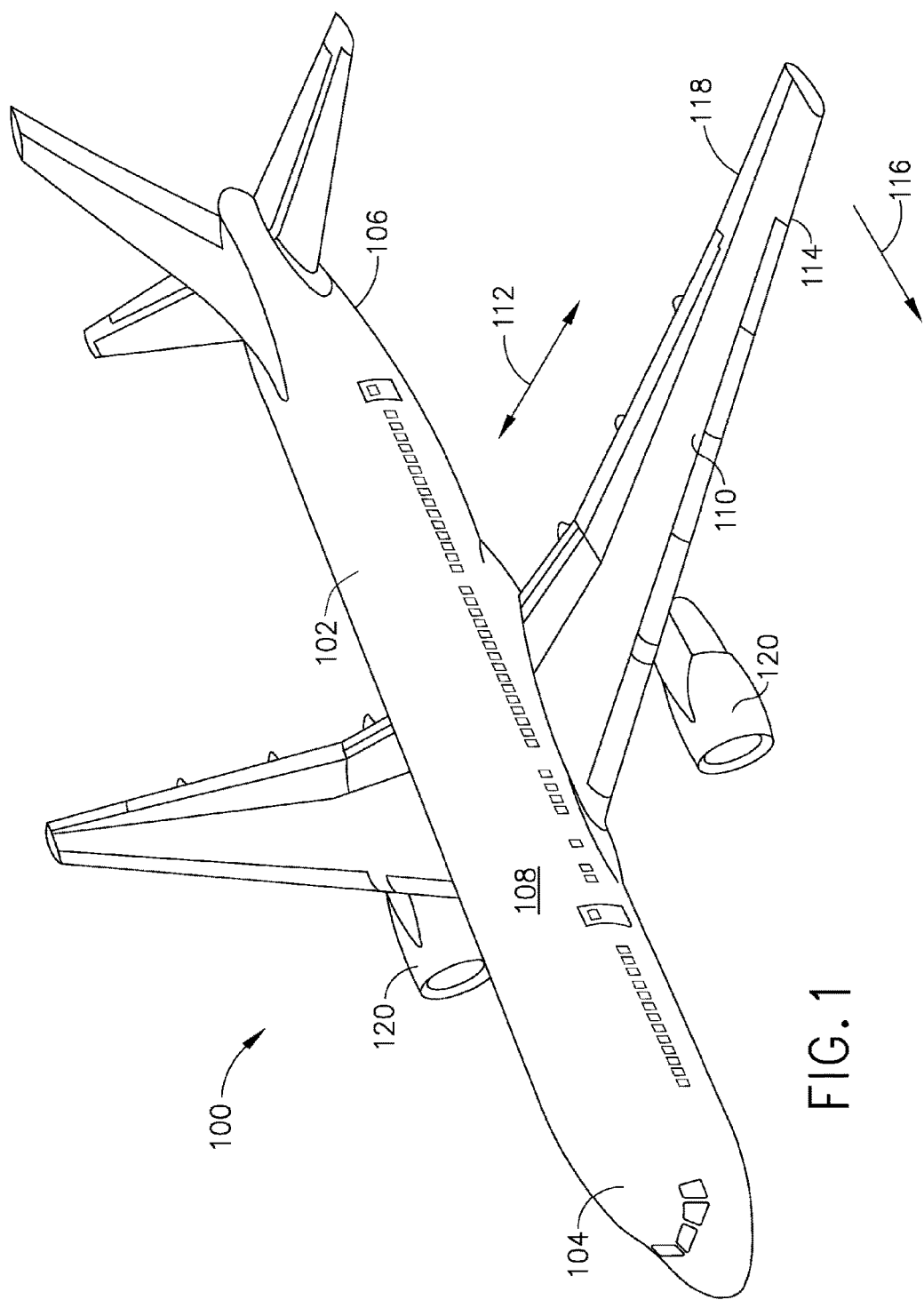
FIG. 1 is a perspective view of an aircraft.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member or fan to generate thrust. In various embodiments, engine 120 may be embodied in a gas turbine engine in a turbo prop or turbo fan configuration and may also be embodied in an electric motor having an open propeller or fan configuration. Engine 120 may also be configured as a gas turbine engine/electric motor hybrid. Engine 120 is coupled to at least one of wing 110 and fuselage 102, for example, in a pusher configuration proximate tail 106.

Figure 2:
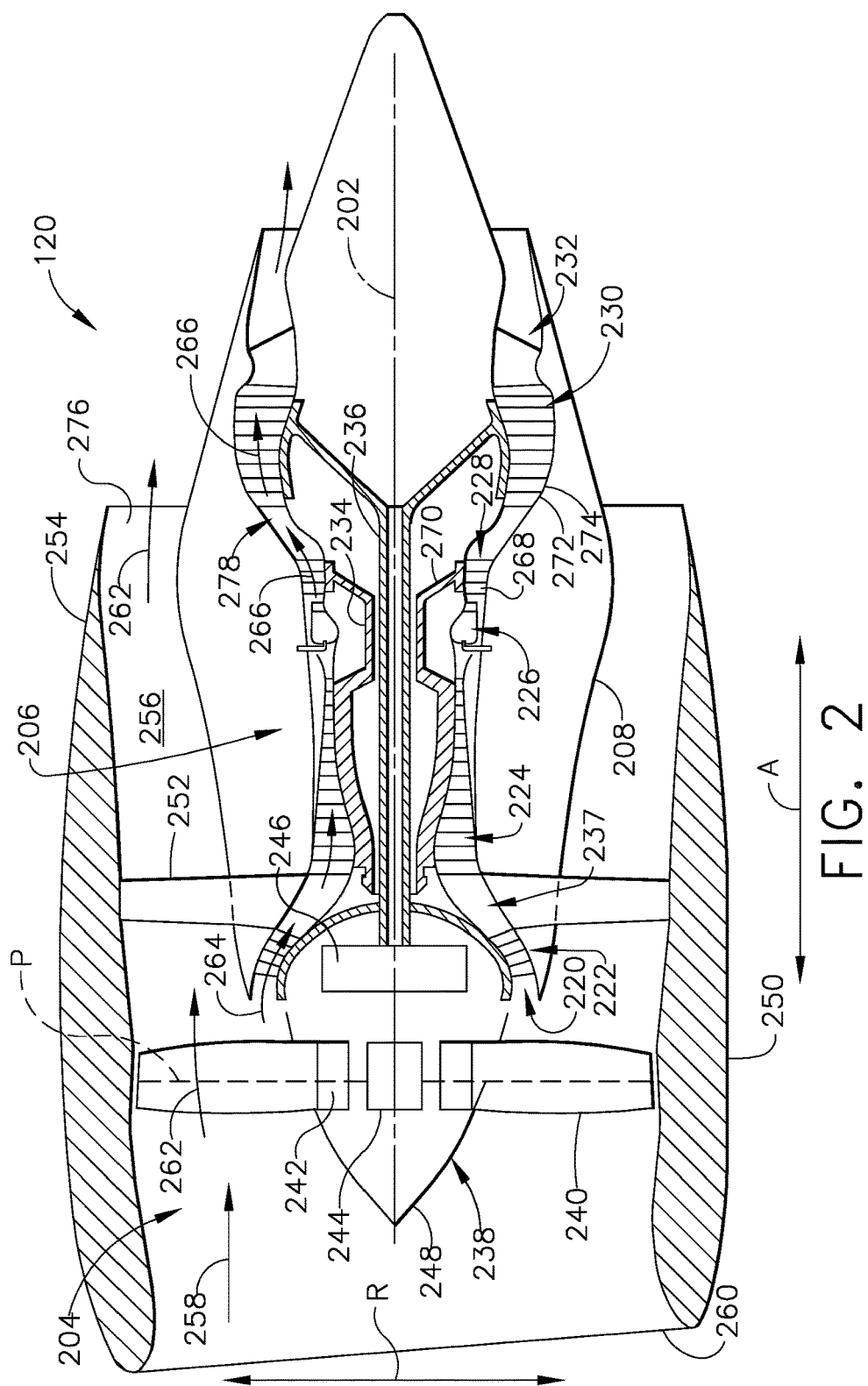
FIG. 2 is a schematic cross sectional view of one of the engines that may be used with the aircraft shown in FIG. 1.

FIG. 2 is a schematic cross-sectional view of engine 120. In the example embodiment, gas turbine engine 120 is embodied in a high-bypass turbofan jet engine. As shown in FIG. 2, turbofan engine 120 defines an axial direction A (extending parallel to a longitudinal axis 202 provided for reference) and a radial direction R. In general, turbofan engine 120 includes a fan section 204 and a core turbine engine 206 disposed downstream from fan section 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustion section 226; a turbine section including a high pressure (HP) turbine 228 and a low pressure (LP) turbine 230; and a jet exhaust nozzle section 232. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustion section 226, turbine section, and nozzle section 232 together define a core air flowpath 237.

In the example embodiment, fan section 204 includes a variable pitch fan 238 having a plurality of fan blades 240 coupled to a disk 242 in a spaced apart relationship. Fan blades 240 extend radially outwardly from disk 242. Each fan blade 240 is rotatable relative to disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 configured to collectively vary the pitch of fan blades 240 in unison. Fan blades 240, disk 242, and pitch change mechanism 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Disk 242 is covered by rotatable front hub 248 aerodynamically contoured to promote an airflow through fan blades 240. Additionally, fan section 204 includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween.

During operation of turbofan engine 120, a volume of air 258 enters turbofan engine 120 through an associated inlet 260 of nacelle 250 and/or fan section 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through high pressure (HP) compressor 224 and into combustion section 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to an inner casing 278 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to inner casing 278 and LP turbine rotor blades 274 that are coupled to LP shaft or spool 236, which drives a rotation of LP shaft or spool 236 and LP compressor 222 and/or rotation of fan 238.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of turbofan engine 120, also providing propulsive thrust. HP turbine 228, LP turbine 230, and jet exhaust nozzle section 232 at least partially define a hot gas path for routing combustion gases 266 through core turbine engine 206.

Turbofan engine 120 is depicted in FIG. 1 by way of example only, and in other exemplary embodiments, turbofan engine 120 may have any other suitable configuration including for example, a turboprop engine.

Figure 3:
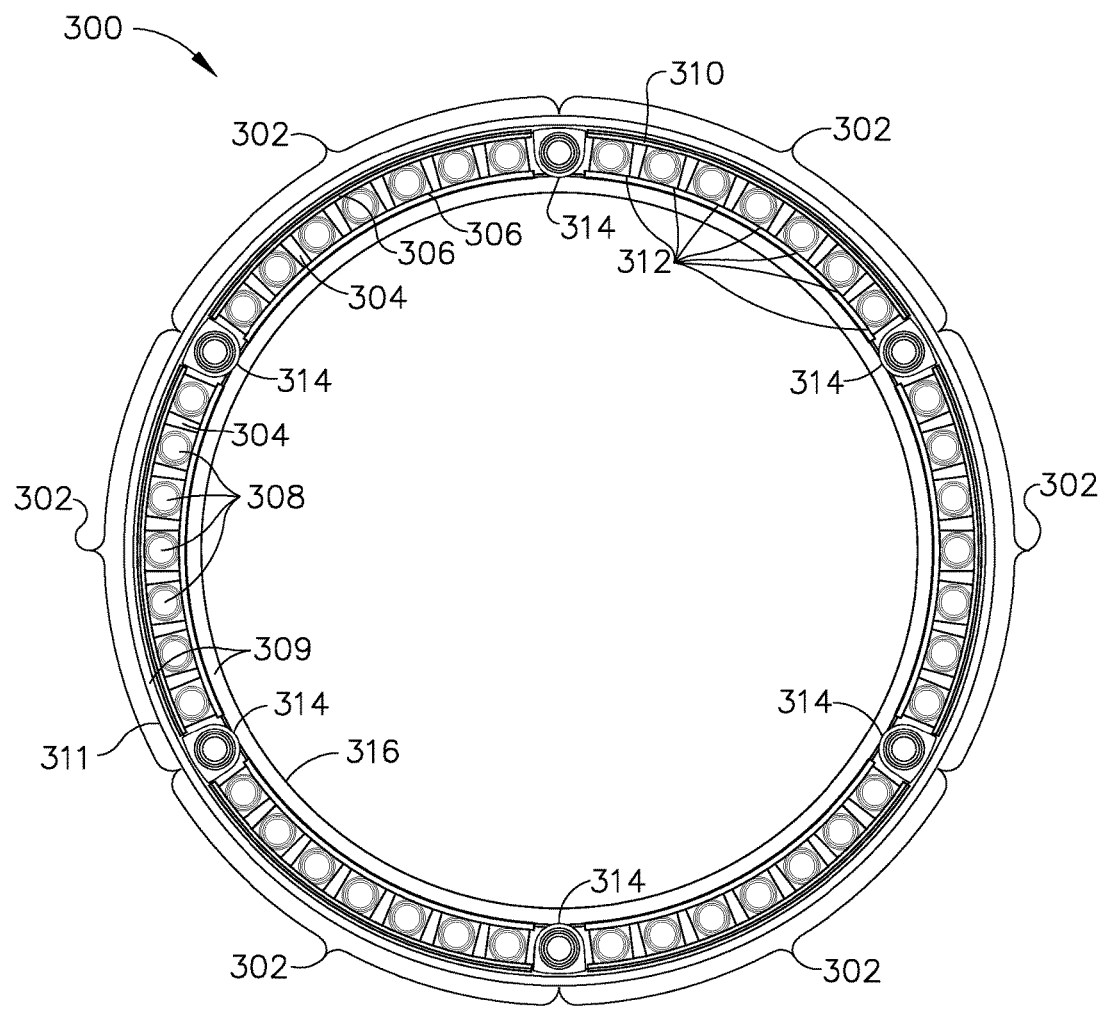
FIG. 3 is an axial view of a connection flange fastening assembly looking aft from a high pressure compressor discharge.

FIG. 3 is an axial view of a connection flange fastening assembly 300 looking aft from a high pressure compressor discharge. In the exemplary embodiment, connection flange fastening assembly 300 includes a plurality of channel assemblies 302 formed of a respective elongate web 304 having a pair of opposing side edges 306. In some embodiments, plurality of channel assemblies 302 are configured as a plurality of circumferential channel assembly segments configured to abut end-to-end around a first face 309 of a first connection flange 311. Although shown as a plurality of arcuate segments, connection flange fastening assembly 300 may also be embodied in a straight segment or a compound curved or angled assembly. Web 304 includes a plurality of spaced apart apertures 308 extending therethrough. At least one side edge of pair of side edges 306 includes at least one anti-rotation lip 310 extending away from the at least one side edge of pair of side edges 306. In the exemplary embodiment, a plurality of threaded nut assemblies 312 is coupled to web 304. A plurality of clinch nut assemblies 314 are coupled to a first flange 316 of a pair of connection flanges (not shown in FIG. 3). Web 304 is positioned face-to-face with first face 309 of first connection flange 316 when connection flange fastening assembly 300 is assembled.

Figure 4:
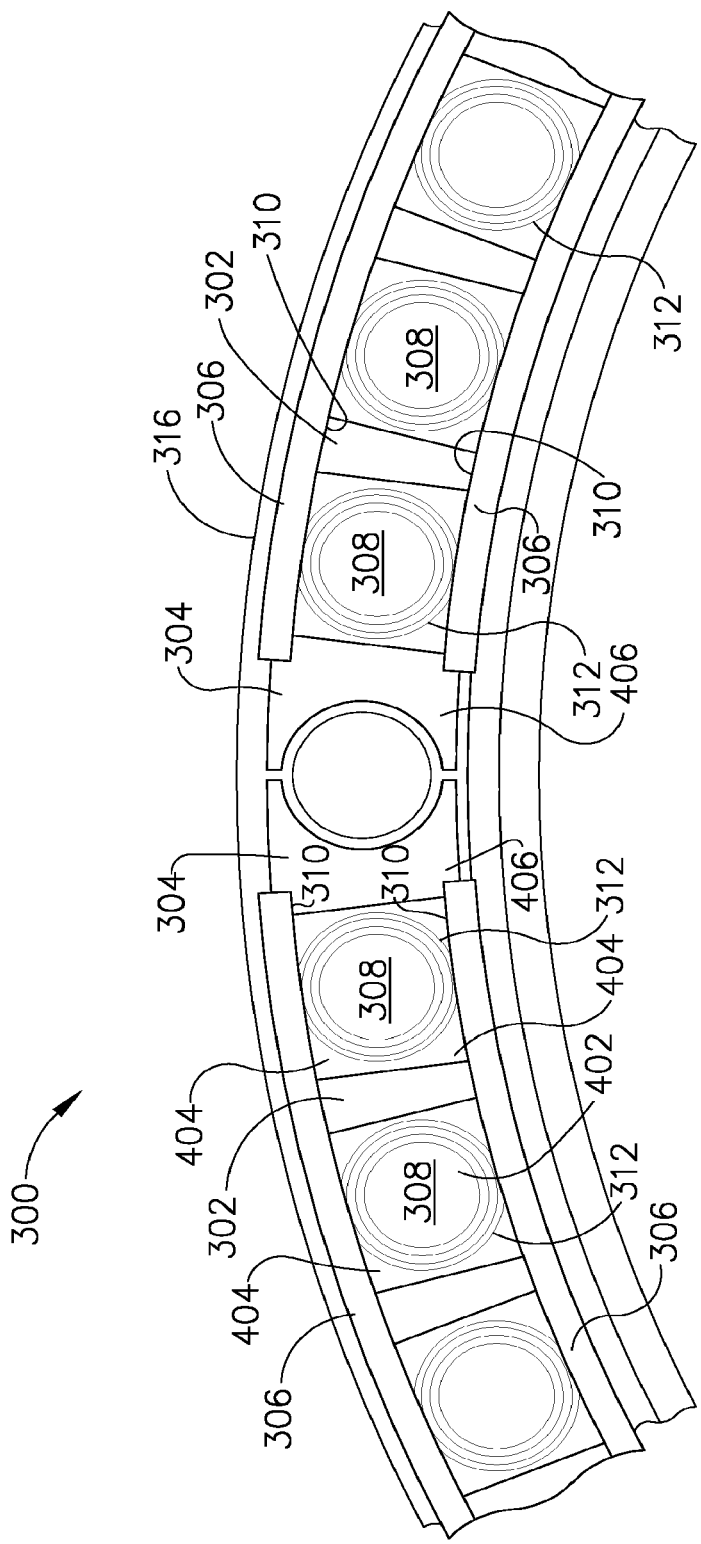
FIG. 4 is an axial view of a portion of the connection flange fastening assembly shown in FIG. 3 looking aft from the high pressure compressor discharge.

FIG. 4 is an axial view of a portion of connection flange fastening assembly 300 looking aft from the high pressure compressor discharge. In the exemplary embodiment, connection flange fastening assembly 300 includes a plurality of threaded nut assemblies 312 coupled to web 304. Each threaded nut assembly 312 of the plurality of threaded nut assemblies 312 includes an internally threaded bore 402 and an external anti-rotation tab 404. Each of the threaded nut assemblies 312 is coupled to web 304 such that bore 402 is aligned with a respective one of the plurality of spaced apart apertures 308. In the example embodiment, each end of web 304 includes an end relief feature that is used to couple web 304 to face 309.

Figure 5:
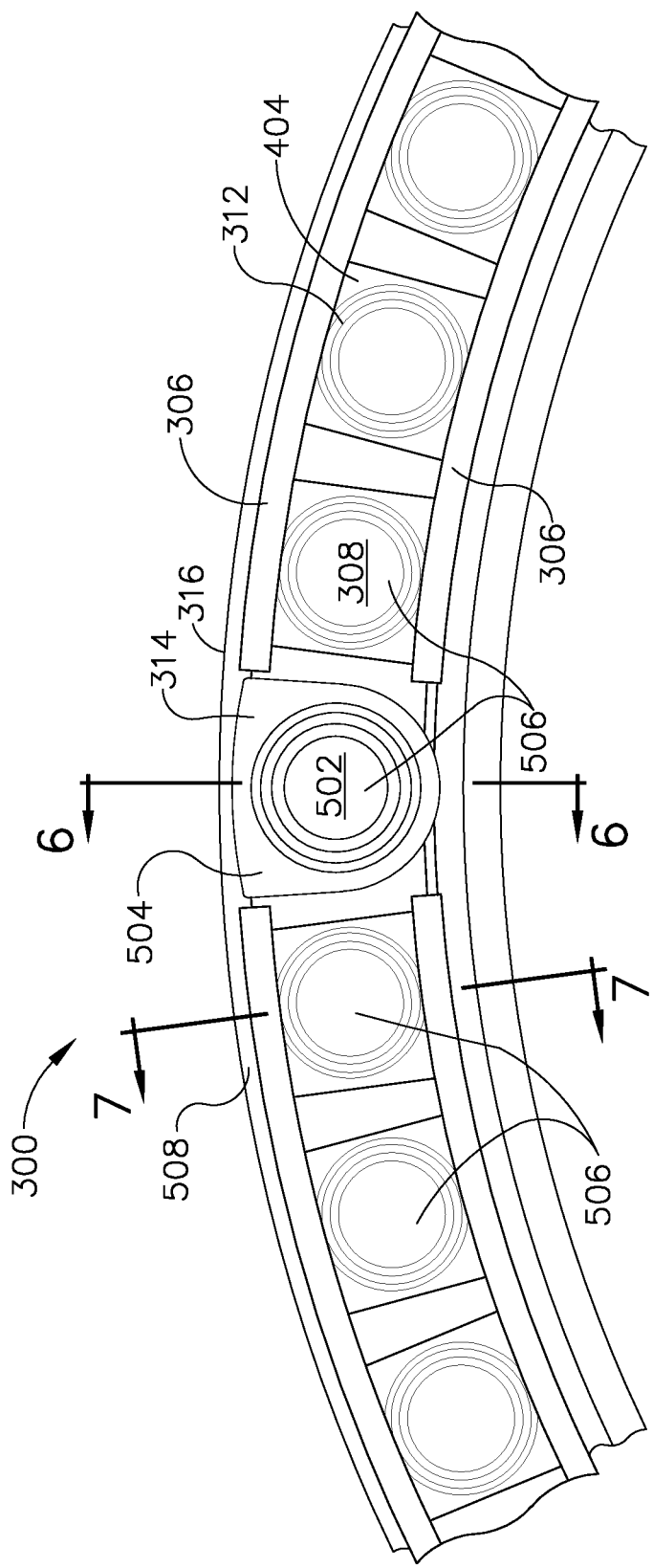
FIG. 5 is another axial view of the portion of the connection flange fastening assembly shown in FIGS. 3 and 4 looking aft from the high pressure compressor discharge.

FIG. 5 is an axial view of the portion of connection flange fastening assembly 300 looking aft from the high pressure compressor discharge. In the exemplary embodiment, connection flange fastening assembly 300 further includes plurality of clinch nut assemblies 314 (only one shown in FIG. 5). Each of clinch nut assembly 314 includes a threaded internal bore 502 and at least one external anti-rotation tang 504. A bore extension (not shown in FIG. 5) of clinch nut assembly 314 is flared onto first flange 316 at a respective first flange fastener hole 506. With a portion 406 of web 304 surrounding first flange fastener hole 506, clinch nut assembly 314 is configured to fixedly couple web 304 to an outside face 508 of first connection flange 316.

Figure 6:
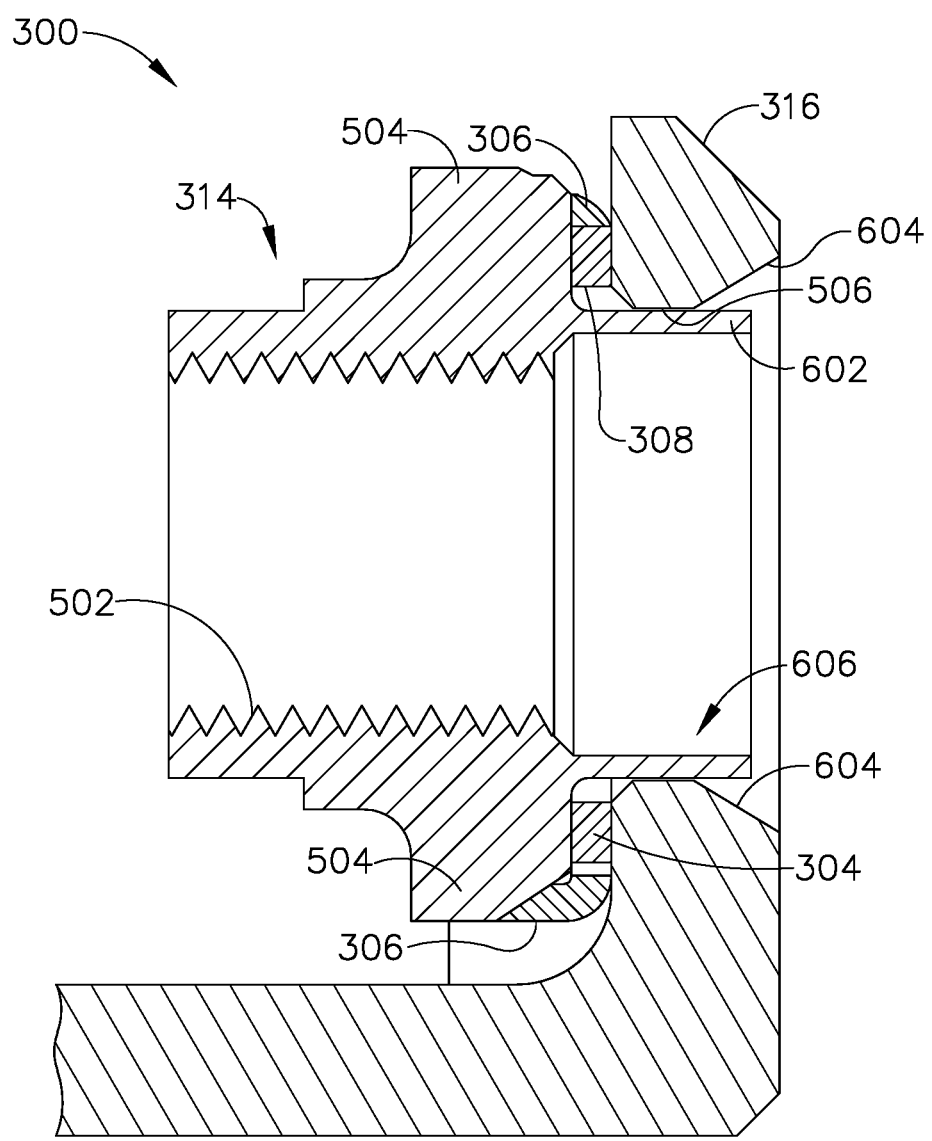
FIG. 6 is a side view of the portion of connection flange fastening assembly shown in FIGS. 3, 4, and 5.

FIG. 6 is a side view of the portion of connection flange fastening assembly 300 shown in FIG. 3. In the exemplary embodiment, clinch nut assembly 314 includes a bore extension 602 that includes a first end 604 formed with clinch nut assembly 314 and a second end 606 extending away from clinch nut assembly 314 proximate at least one external anti-rotation tang 504. Bore extension 602 is configured to be flared onto first flange fastener hole 506 using a countersunk surface 604 of first flange fastener hole 506.

Figure 7:
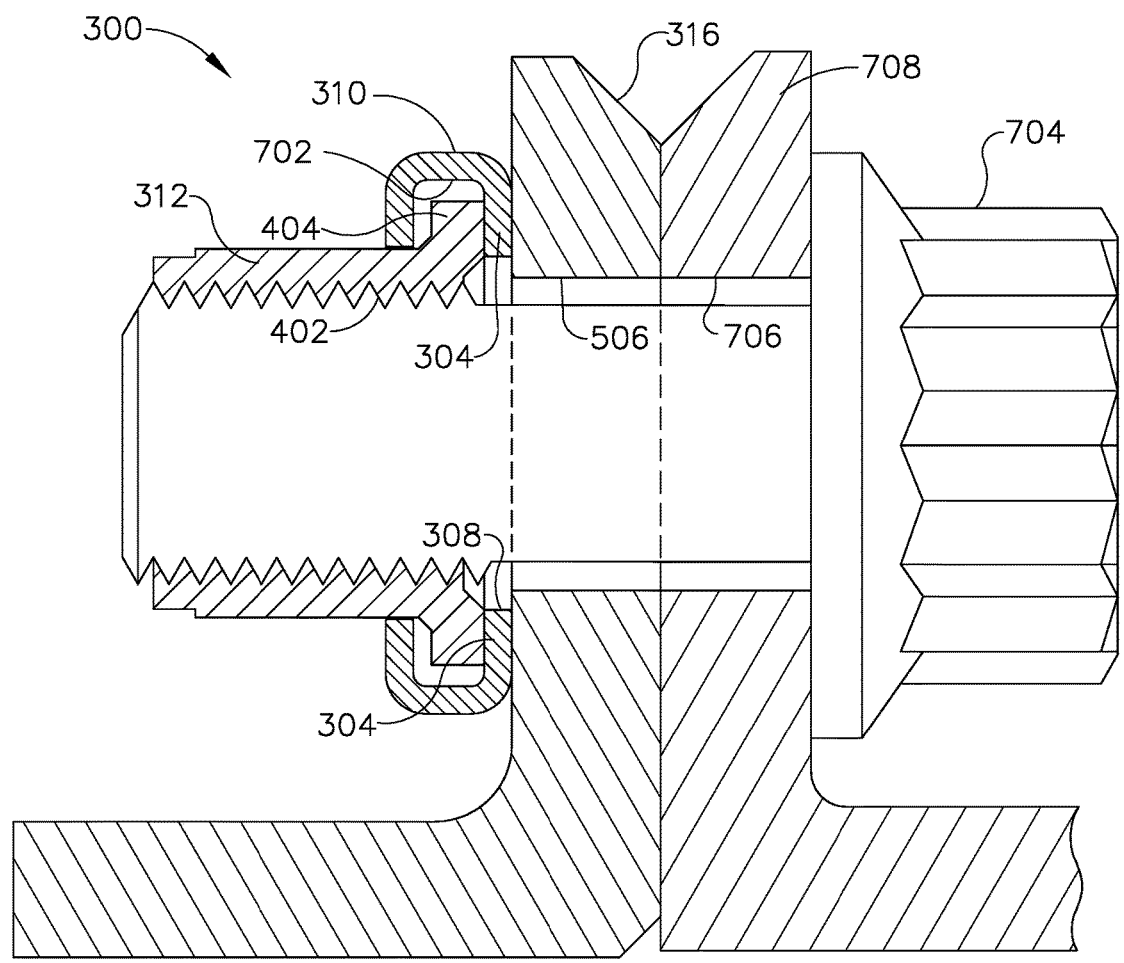
FIG. 7 is another side view of the portion of connection flange fastening assembly shown in FIGS. 3, 4, and 5.

FIG. 7 is a side view of the portion of connection flange fastening assembly 300 (shown in FIG. 3). In the exemplary embodiment, anti-rotation lip 310 includes a retaining groove 702 configured to engage anti-rotation tab 404 of each of the plurality of threaded nut assemblies 312. During assembly of connection flange fastening assembly 300 threaded nut assemblies 312 and clinch nut assemblies 314 are configured to receive threaded fasteners 704 that have passed through a respective aperture 706 in a second connection flange 708, respective first flange fastener hole 506 in first connection flange 316 and a respective aperture in web 304.

Figure 8:
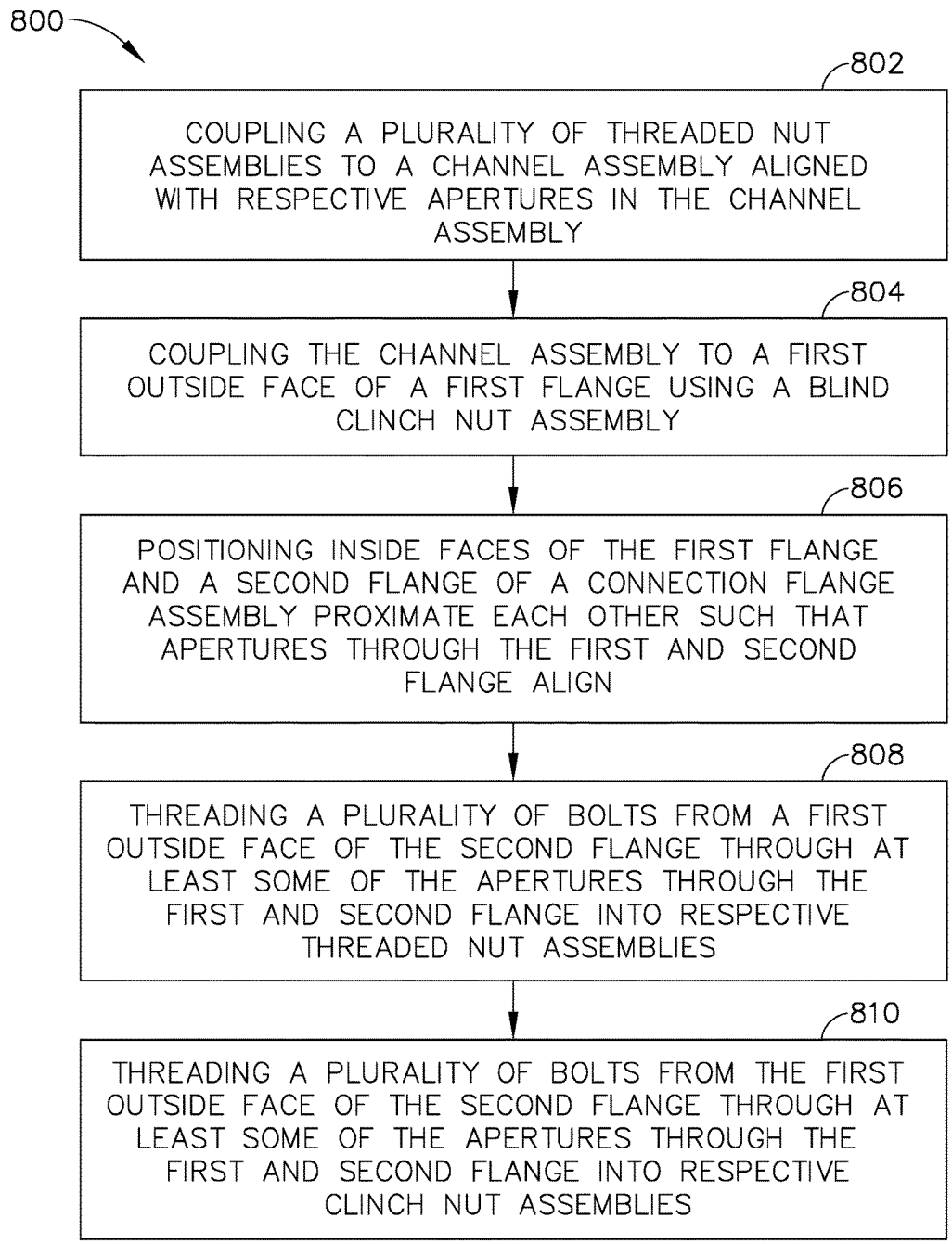
FIG. 8 is a flow chart of a method of fastening a flanged connection.

FIG. 8 is a flow chart of a method 800 of fastening a flanged connection. In the exemplary embodiment, method 800 includes coupling 802 a plurality of threaded nut assemblies to a channel assembly aligned with respective apertures in the channel assembly and coupling 804 the channel assembly to a first outside face of a first flange using a blind clinch nut assembly. In the exemplary embodiment, method 800 may include coupling the plurality of threaded nut assemblies to only the channel assembly and coupling the clinch nut assemblies to the first flange. Optionally, method 800 further includes inserting a bore extension of the clinch nut assembly through a portion of the channel assembly and an aperture of the first flange and flaring the bore extension in the aperture. The aperture may be counter-sunk to permit flaring of the bore extension. In various embodiments, the channel assembly includes an anti-rotation lip and the threaded nut assemblies and clinch nut assemblies include an external anti-rotation tab. In such embodiments, method 800 optionally includes coupling at least some of the threaded nut assemblies to the channel assembly using the anti-rotation lip and anti-rotation tabs. Method 800 further includes positioning 806 inside faces of the first flange and a second flange of a connection flange assembly proximate each other such that apertures through the first and second flange align and threading 808 a plurality of bolts from a first outside face of the second flange through at least some of the apertures through the first and second flange into respective threaded nut assemblies. Method 800 also includes threading 810 a plurality of bolts from a first outside face of the second flange through at least some of the apertures through the first and second flange into respective clinch nut assemblies. During the threading of the plurality of bolts, the at least one of the threaded nut assemblies and the clinch nut assemblies are prevented from turning with the bolts using the respective anti-rotation tabs.

The above-described fastening assembly provides an efficient method for coupling a flange joint. Specifically, the above-described connection flange fastening assembly includes a ganged threaded nut assembly that permits a blind capture of fastening bolts for assembling the flange joint in areas where access to an outside face of one of the connecting flanges is limited. The ganged threaded nut assembly is coupled to the outside surface of the flange using clinch nuts that attach the ganged threaded nut assembly to the face of the flange and are flared into a respective hole in the flange. The threaded nut assemblies and clinch nut assemblies have threaded bores that align with respective apertures in the flanges and a web of the ganged clinch nut assembly.

The above-described embodiments of a method and system of coupling a flange joint provides a cost-effective and reliable means for assembling machines, such as, but not limited to gas turbine engines. More specifically, the methods and systems described herein facilitate bolting flanges together when one side of the flange connection is inaccessible or when only limited accessibility to fastener positions are available proximate the face of the flange. As a result, the method and system described herein facilitate the assembly of machines in a cost-effective and reliable manner.

Exemplary embodiments of fastening assembly systems are described above in detail. The fastening assembly systems, and methods of assembling machines using the fastening assembly systems are not limited to the specific embodiments described herein, but rather, components of the systems and/or steps of the methods may be utilized independently and separately from other components and/or steps described herein. For example, the methods may also be used in combination with other systems requiring assembly where components are tightly spaced with limited access to some components during the assembly process, and are not limited to practice with only the systems and methods as described herein. Rather, the exemplary embodiment can be implemented and utilized in connection with many other machinery applications that are currently configured to receive and accept fastening assembly systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastening assembly comprising:
    a first connection flange having a plurality of fastener holes formed therein;
    a channel assembly comprising:
    an elongate web having a pair of opposing side edges, wherein said web is positioned face-to-face with an outside face of the first connection flange;
    a plurality of spaced apart apertures extending through said web; and
    at least one anti-rotation lip extending away from said at least one side edge of said pair of side edges, wherein said anti-rotation lip includes a retaining groove;
    a threaded nut assembly comprising a threaded internal bore and an external anti-rotation tab, said threaded nut assembly coupled to said web with said threaded bore aligned with a respective one of said plurality of spaced apart apertures, and with said external anti-rotation tab received in said retaining groove; and
    a clinch nut assembly comprising a threaded internal bore, an external anti-rotation tang, and a bore extension, wherein said bore extension comprises a first end formed with said clinch nut assembly and a second end extending away from said clinch nut assembly, said second end flared in one of the fastener holes in the connection flange, and wherein the web is positioned between said clinch nut assembly and the outside face such that the clinch nut assembly fixedly couples said web to the outside face of the first connection flange.

2. The assembly of claim 1, wherein said channel assembly is arcuate.

3. The assembly of claim 1, wherein said channel assembly comprises a plurality of circumferential segments configured to abut end to end around the outside face of the first connection flange.

4. The assembly of claim 1, wherein said threaded nut assembly and said clinch nut assembly are configured to receive threaded fasteners that have passed through a respective fastener hole in the first connection flange and a respective aperture in the web.

5. A turbine engine comprising:
    a first connection flange having a plurality of fastener holes formed therein and a second connection flange complementary to said first connection flange;
    a fastening assembly comprising:
    a channel assembly comprising:
    an elongate web having a pair of opposing side edges, wherein said web is positioned face-to-face with an outside face of the first connection flange;
    a plurality of spaced apart apertures extending through said web; and
    at least one anti-rotation lip extending away from said at least one side edge of said pair of side edges, wherein said anti-rotation lip includes a retaining groove;
    a threaded nut assembly comprising a threaded internal bore and an external anti-rotation tab, said threaded nut assembly coupled to said web with said threaded bore aligned with a respective one of said plurality of spaced apart apertures, and with said external anti-rotation tab received in said retaining groove; and
    a clinch nut assembly comprising a threaded internal bore, an external anti-rotation tang, and a bore extension, wherein said bore extension comprises a first end formed with said clinch nut assembly and a second end extending away from said clinch nut assembly, said second end flared in one of the fastener holes in the connection flange, and wherein the web is positioned between said clinch nut assembly and the outside face such that the clinch nut assembly fixedly couples said web to the outside face of the first connection flange.

6. The engine of claim 5, wherein said channel assembly is arcuate.

7. The engine of claim 5, wherein said channel assembly comprises a plurality of circumferential segments configured to abut end to end around the outside face of the first connection flange.

8. The engine of claim 5, wherein said threaded nut assembly and said clinch nut assembly are receive threaded fasteners that have passed through a respective fastener hole in the first connection flange and a respective aperture in the web.

9. A method of coupling a flange joint, said method comprising:
    providing a channel assembly including an elongate web having a pair of opposing side edges, a plurality of spaced apart apertures extending through said web, and at least one anti-rotation lip extending away from said at least one side edge of said pair of side edges, wherein said anti-rotation lip includes a retaining groove;
    coupling the channel assembly to a first connection flange using a blind clinch nut assembly, wherein the blind clinch nut assembly includes a threaded internal bore, an external anti-rotation tang, and a bore extension, wherein said bore extension comprises a first end formed with said clinch nut assembly and a second end extending away from said clinch nut assembly, and wherein the web is positioned between said clinch nut assembly and an outside face of the first connection flange such that the clinch nut assembly fixedly couples said web face-to-face to the outside face of the first connection flange;
    wherein coupling the channel assembly to a first outside face of a first flange using a blind clinch nut assembly comprises inserting the bore extension through a portion of the channel assembly and an aperture of the first connection flange and flaring the second end of the bore extension in the aperture;
    coupling a plurality of threaded nut assemblies each including a threaded internal bore and an external anti-rotation tab to said channel assembly, with said threaded bore aligned with a respective one of said plurality of space apart apertures, and with said external anti-rotation tab received in the retaining groove;

positioning inside faces of the first connection flange and a second connection flange proximate each other such that apertures through the first and second connection flanges align;

threading a plurality of bolts from an outside face of the second connection flange through at least some of the apertures through the first and second connection flanges into respective ones of the threaded nut assemblies; and threading a bolt from the first outside face of the second connection flange through aligned ones of the apertures through the first and second connection flanges into the clinch nut assembly.

10. The method of claim 9, wherein threading a plurality of bolts comprises preventing at least one of the threaded nut assemblies and the clinch nut assembly from turning with the bolts using anti-rotation tabs.

11. The method of claim 10, further comprising countersinking the apertures of the first connection flange from the inside face thereof.

* * * * *